(12) United States Patent
Feng et al.

(10) Patent No.: US 9,982,997 B2
(45) Date of Patent: May 29, 2018

(54) LASER MEASUREMENT SYSTEM AND METHOD FOR MEASURING 21 GMES

(71) Applicant: Beijing Jiaotong University, Beijing (CN)

(72) Inventors: Qibo Feng, Beijing (CN); Bin Zhang, Beijing (CN); Cunxing Cui, Beijing (CN)

(73) Assignee: Beijing Jiaotong University, Beijing (CN)

( * ) Notice: Subject to any disclaimer, the term of this patent is extended or adjusted under 35 U.S.C. 154(b) by 0 days. days.

(21) Appl. No.: 14/895,991

(22) PCT Filed: Jan. 22, 2015

(86) PCT No.: PCT/CN2015/071300
§ 371 (c)(1),
(2) Date: Dec. 4, 2015

(87) PCT Pub. No.: WO2016/115704
PCT Pub. Date: Jul. 28, 2016

(65) Prior Publication Data
US 2017/0314916 A1 Nov. 2, 2017

(51) Int. Cl.
*G01B 11/26* (2006.01)
*G01B 11/27* (2006.01)
*G01B 11/00* (2006.01)

(52) U.S. Cl.
CPC .......... *G01B 11/272* (2013.01); *G01B 11/002* (2013.01)

(58) Field of Classification Search
CPC ..... G01B 11/245; G01B 11/306; G01B 11/24; G01B 11/2433; G02B 21/0016

USPC ......................................................... 356/138
See application file for complete search history.

(56) References Cited

U.S. PATENT DOCUMENTS

| | | | | |
|---|---|---|---|---|
| 4,804,270 A | * | 2/1989 | Miller | G01B 11/26 356/508 |
| 4,884,889 A | * | 12/1989 | Beckwith, Jr. | G01B 11/005 33/1 M |
| 4,939,678 A | * | 7/1990 | Beckwith, Jr. | G01B 11/005 33/1 M |
| 5,798,828 A | * | 8/1998 | Thomas | G01B 11/26 33/286 |

(Continued)

*Primary Examiner* — Md M Rahman
(74) *Attorney, Agent, or Firm* — Hammer & Associates, PC (57) ABSTRACT

A laser measurement system for measuring up to 21 geometric errors, in which a six-degree-of-freedom geometric error simultaneous measurement unit and a beam-turning unit are mounted on either the clamping workpiece or the clamping tool, while an error-sensitive unit is mounted on the remaining one, the beam-turning unit has several switchable working postures and multi-component combinations in its installation state, it can split or turn the laser beam from the six-degree-of-freedom geometric error simultaneous measurement unit to the X, Y, and Z directions in a proper order, or the beam-turning unit can split or turn a beam from the error-sensitive unit to the six-degree-of-freedom geometric error simultaneous measurement unit. The present invention is of simple configuration and convenient operation. Up to 21 geometric errors of three mutual perpendicular linear motion guides are obtained by a single installation and step-by-step measurement.

13 Claims, 5 Drawing Sheets

(56) References Cited

U.S. PATENT DOCUMENTS

| | | | | |
|---|---|---|---|---|
| 5,832,416 | A | * | 11/1998 | Anderson ............ G01B 21/042 702/152 |
| 6,049,377 | A | | 4/2000 | Lau et al. |
| 2011/0102778 | A1 | * | 5/2011 | Jywe .................... G01B 11/002 356/139.1 |
| 2012/0253505 | A1 | * | 10/2012 | Matsushita .......... G05B 19/401 700/193 |

* cited by examiner

LASER MEASUREMENT SYSTEM AND METHOD FOR MEASURING 21 GMES

FIELD OF THE INVENTION

The present invention relates to a laser measurement system and method for measuring up to 21 GMEs (geometric motion errors), which is used to an accuracy measurement for precise machining and measuring equipment, such as a numerical control machine tool, a machining center or a coordinate measuring machine. The field of the invention pertains to the dimensional geometric accuracy measurement, particularly to a laser measurement system and method for measuring the 21 GMEs of three mutual perpendicular linear motion guides of the equipment listed above by a single installation and step-by-step measurement.

The 21 GMEs include the 6 GMEs of the X-axis, the 6 GMEs of the Y-axis, the 6 GMEs of the Z-axis, the perpendicularity error between the X-axis and the Y-axis, the perpendicularity error between the Y-axis and the Z-axis, and the perpendicularity error between the X-axis and the Z-axis.

BACKGROUND OF THE INVENTION

DE10341594A1 discloses a method for directly measuring the geometric errors of the numerical control machine tool, the machining center or the coordinate measuring machine. The beam from the laser interferometer is splitted to be parallel to the three linear motion axes of the equipment listed above. The laser interferometer directly measures the geometric errors of the three linear motion axes. However, the system configuration is complicated, and the assembly and adjustment of the system is difficult. Moreover, the roll error of the three linear motion axes cannot be measured.

In prior art, there exist no such a measurement system which offers simple configuration and convenient operation, and can directly measure up to 21 GMEs of three mutual perpendicular linear motion axes by a single installation and step-by-step measurement.

SUMMARY OF THE INVENTION

The object of the present invention is to provide a laser measurement system for measuring up to 21 GMEs of three mutual perpendicular linear motion guides of precise machining and measuring equipment, such as a numerical control machine tool, a machining center or a coordinate measuring machine, which is of simple configuration and allows for convenient operation. The 21 GMEs of three mutual perpendicular linear motion guides are directly measured by a single installation and step-by-step measurement.

Thus, according to one aspect of the present invention, there provides a laser measurement system for measuring up to 21 GMEs, which consists of a 6DOF (six-degree-of-freedom) GME simultaneous measurement unit, a beam-turning unit, and an error-sensitive unit. The 6DOF GME simultaneous measurement unit is combined with the error-sensitive unit to simultaneously measure the 6DOF GME of a single axis, which includes position error, horizontal and vertical straightness errors, yaw, pitch, and roll. There are 18 GMEs for the three axes. The beam-turning unit splits or turns the laser beam from the 6DOF GME simultaneous measurement unit to the X, Y and Z directions in proper order. Similarly, the beam-turning unit splits or turns the beam from the error-sensitive unit to the 6DOF GME simultaneous measurement unit to simultaneously measure the 6DOF GMEs of the corresponding axis. The perpendicularity errors among the three axes are obtained by processing the straightness errors of the three axes.

Preferably, the error-sensitive unit is composed of three mutual perpendicular 6DOF error-sensitive components, which are sensitive to the 6DOF GMEs of three mutual perpendicular linear motion axes of the equipment listed above. Similarly, the error-sensitive unit is composed of two mutual perpendicular 6DOF error-sensitive components, which are sensitive to the 6DOF GMEs of two mutual perpendicular linear motion axes of the equipment listed above. One of the two 6DOF error-sensitive components is sensitive to the 6DOF GME of the third linear motion axis of the equipment listed above through a 90-degree rotation.

Preferably, the 6DOF error-sensitive component consists of two retro-reflector elements and one beam-splitting element. The retro-reflector element is sensitive to the position error, horizontal straightness error, and vertical straightness error of a linear motion axis. The beam-splitting element is sensitive to the pitch and yaw of the linear motion axis. The combination of the two retro-reflector elements is sensitive to the roll of the linear motion axis. The cube-corner reflector is used as the retro-reflector element, and the plane beam-splitter is used as the beam-splitting element.

Preferably, the beam-turning unit consists of the beam-turning prism, or the combination of the beam-splitting prism and the beam-turning prism. Through translation and rotation, the beam-turning prism, which includes a polygon prism or a rectangle prism, turns the measurement beam from the 6DOF GME simultaneous measurement unit to the directions which are parallel to the three linear motion axes of the equipment listed above. The combination of the beam-splitting prism and the beam-turning prism is the combination of two beam-splitting polygon prisms, or the combination of two beam-splitting rectangle prisms. The beam from the 6DOF GME error simultaneous measurement unit is split into three mutual perpendicular beams, which are parallel to the three linear motion axes of the equipment listed above.

According to another aspect of the present invention, there provides a method for measuring up to 21 geometric errors of the precise machining and measuring equipment, such as a numerical control machine tool, a machining center, and a coordinate measuring machine by single installation and step-by-step measurement. This method includes the following procedures:

(1) installating the measurement system. The 6DOF GME simultaneous measurement unit and the beam-turning unit are mounted independently or integrally on the clamping workpiece of the equipment listed above. The error-sensitive unit is mounted on the clamping tool of the equipment listed above.

(2) adjusting the measurement system. The three axes of the equipment listed above are adjusted to the initial positions predetermined by measurement standards such as ISO 230-1. The error-sensitive unit is placed as close as possible to the beam-turning unit, and this predetermined initial position is defined as the start point. By adjusting the 6DOF GME simultaneous measurement unit and the beam-turning unit, the three measurement beams, which are parallel to the X, Y, and Z axes of the equipment listed above, are obtained simultaneously or in separate steps according to the different beam turning structures of the laser beam-turning unit.

(3) measuring the 6DOF GMEs of the X-axis. The beam-turning unit directs the beam from the six-degree-of-freedom geometric error simultaneous measurement unit to the direction parallel to the X-axis of the equipment listed above. Controlling the motion of the equipment listed above, the laser measurement system for 21 geometric errors is set to the start point. The 6DOF GMEs of the start point, including position error, horizontal and vertical straightness errors, pitch, yaw, and roll, are obtained by the 6DOF GME simultaneous measurement unit combined with the corresponding 6DOF error-sensitive component of the error-sensitive unit. The linear guide moves along the X-axis with the interval predetermined by related measurement standards, such as ISO230-1, and reaches the next measurement point while the Y and Z axes are kept static. The 6DOF GMEs of this point are measured. The measurement is performed point-by-point until the last measurement point, and the errors of all the measurement points on the X-axis are obtained. The linear guide moves along the X-axis in the opposite direction with the same interval. The measurement is performed point-by-point to obtain the errors of all the measurement points. In this way, the errors of all the measurement points in bidirectional movement are obtained through point-by-point static measurement. In another way, the linear guide moves from the start point to the farthest end and returns to the start point in a constant speed, and the continuous measurement is conducted by the 6DOF GME simultaneous measurement unit, combined with the corresponding 6DOF error-sensitive component of the error-sensitive unit. The errors of all the measurement points on the X-axis in bidirectional movement are obtained through dynamic measurement.

(4) measuring the 6DOG GMEs of the Y-axis. The beam-turning unit directs the beam from the 6DOF GME simultaneous measurement unit to the direction parallel to the Y-axis of the equipment previously listed. The linear guide moves along the Y-axis according to the procedures mentioned in step (3), and the errors of all the measurement points on the Y-axis in bidirectional movement are obtained through point-by-point static measurement or continuous dynamic measurement.

(5) measuring the 6Ddof GMEs of the Z-axis. The beam-turning unit directs the beam from the 6DOF geometric error simultaneous measurement unit to the direction parallel to the Z-axis of the equipment previously listed. The linear guide moves along the Z-axis according to the procedures mentioned in step (3), and the errors of all the measurement points on the Z-axis in bidirectional movement are obtained through point-by-point static measurement or continuous dynamic measurement.

(6) Data processing. By performing steps (3), (4), and (5), the invention obtains 6DOF GMEs of each of the measurement points on the X, Y and Z axes of the measured equipment previously listed in bidirectional movement. The total errors are 18. The three perpendicularity errors among the three motion axes are obtained by data processing according to the measurement standards, such as ISO 230-1. Therefore, a total of 21 geometric errors are obtained.

The order of measuring the X, Y and Z axes according to steps (3), (4), and (5) has no influence on the measurement results. The same results are obtained by performing steps (1) through (6) when the error-sensitive unit is fixed on the clamping workpiece and the 6DOF GMEs simultaneous measurement unit and the beam-turning unit are mounted integrally on the clamping tool of the equipment previously listed.

The advantages of the present invention are as follows:

(1) The 6DOF error-sensitive component in the present invention consists of two retro-reflector elements and one beam-splitting element. Only two measurement beams need to simultaneously measure the 6DOF GMEs for one axis. There are fewer beam-splitting elements in the system, which makes the system highly integrated.

(2) Only a single installation is needed to calibrate the three linear motion axes of the equipment previously listed. The measurement efficiency is highly improved.

(3) Three mutual perpendicular measurement beams, which are used as the reference datum for the perpendicularity error measurement, are obtained through the beam-turning unit. The three perpendicularity errors are obtained by processing data of the geometric errors of the three linear motion axes.

Generally speaking, the invention is of simple configuration and allows for high integration with fewer optical elements. The 21 GMEs of three linear motion guides of the equipment previously listed are obtained through single installation and step-by-step measurement.

A reliable instrument that simultaneously measures the 6DOF GMEs is not available in prior art. The present invention measures not only the 6DOF GMEs of a single axis, but also the 21 GMEs of three axes. The measurement system provided by the invention is of small size, and allows high integration and accuracy. The system is strongly immune from surrounding disturbance because the laser drift can be compensated in real time.

In conventional measurement methods, three mutual perpendicular datum lines are obtained by mechanical components or optical elements, and several manual installations are needed. Therefore, installation deviation is introduced during the installation process. The beam-turning unit consists of the beam-turning prism or the combination of the beam-splitting prism and the beam-turning prism. The three measurement beams, which are parallel to the three linear motion axes and are used as the measurement reference datum lines for three perpendicularity errors, are obtained simultaneously or step-by-step by the beam-turning unit based on the inherent properties of optical elements and the precision electro-kinetic rotation axis for 90-degree rotation.

In conventional measurement methods for multi-axes, different installations are needed to realign the measurement unit and the moving unit during the measurement of different axes. The measured parameters are limited, and the measurement efficiency is low. The proposed measurement system contains the beam-turning unit and the error-sensitive unit, which is composed of three mutual perpendicular 6DOF error-sensitive components. Three mutual perpendicular measurement beams are obtained by adjusting the positions and directions of the 6DOF GME simultaneous measurement unit and the beam-turning unit after the system installation and before the actual measurement. The alignment of the three measurement beams and the three 6DOF error-sensitive components is achieved by the movement of linear guide along the three axes. The 21 GMEs are measured through single installation and step-by-step measurement, which greatly improves the measurement efficiency and reduces the potential for manual errors.

DESCRIPTION OF THE PREFERRED EMBODIMENTS

Figure 1:
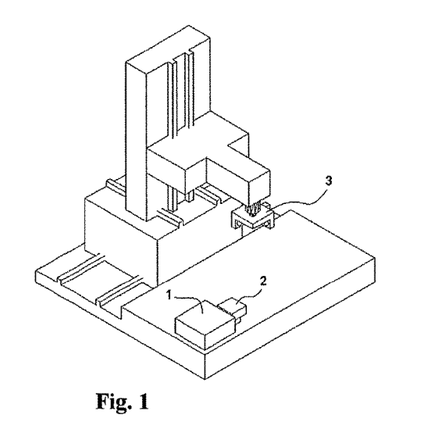
FIG. 1 is a schematic view of the first embodiment of the laser measurement system for 21 GMEs provided by the present invention.

As shown in FIG. 1, the laser measurement system for the 21 GMEs provided by the present invention consists of the 6DOF GME simultaneous measurement unit 1, the beam-turning unit 2 and the error-sensitive unit 3. The error-sensitive unit 3 is fixed on the clamping tool of the measured numerical control machine tool, the machining center, and the coordinate measuring machine. The measurement unit 1 and the beam-turning unit 2 are mounted on the clamping workpiece of the equipment previously listed.

Figure 2:
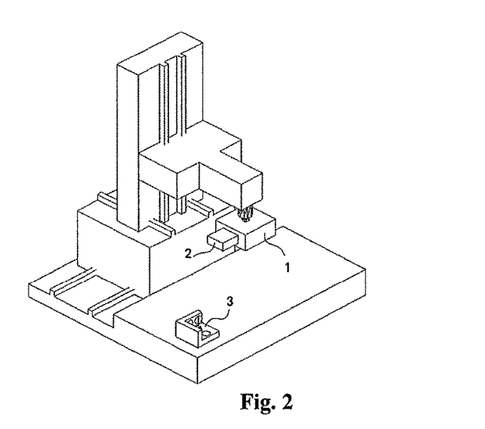
FIG. 2 is a schematic view of the second embodiment of the laser measurement system for 21 GMEs provided by the present invention.

Referring to FIG. 2, the error-sensitive unit 3 can also be fixed on the clamping workpiece, while the measurement unit 1 and the beam-turning unit 2 can also be mounted on the clamping tool of the equipment previously listed.

Figure 3:
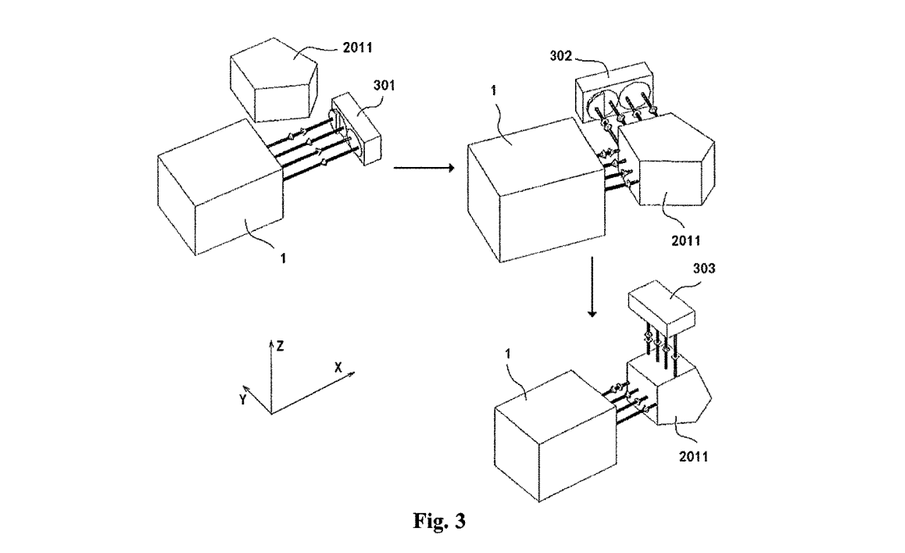
FIG. 3 is a schematic view of the first type of beam-turning unit in the present invention.

As shown in FIG. 3, the pentagonal prism 2011 is used in the beam turning 2 to turn the laser beam from the measurement unit 1. The pentagonal prism 2011 is removed from the light path of measurement unit 1 by manual or electro-kinetic operation. The measurement beam, which is parallel to the X-axis and reaches the 6DOF error-sensitive component 301, is obtained by adjusting the position and direction of the measurement unit 1. The pentagonal prism 2011 is then placed into the light path of the measurement unit 1 by manual or electro-kinetic operation. The measurement beam, which is parallel to the Y-axis and reaches the six-degree-of-freedom error-sensitive component 302, is obtained by adjusting the pentagonal prism 2011 to make the measurement beam enter it perpendicularly. The straight line parallel to X-axis and passing through the center of the incident plane of the pentagonal prism 2011 is used as the rotation axis. The pentagonal prism 2011 is rotated by 90 degrees through the precise rotation component which is fixed with the pentagonal prism 2011. The measurement beam, which is parallel to the Z-axis and reaches the 6DOF error-sensitive component 303, is then obtained. In this way, the three measurement beams, which are parallel to the X, Y, and Z axes of the previously listed equipment are obtained step-by-step by the first type of the beam-turning unit 2.

Figure 4:
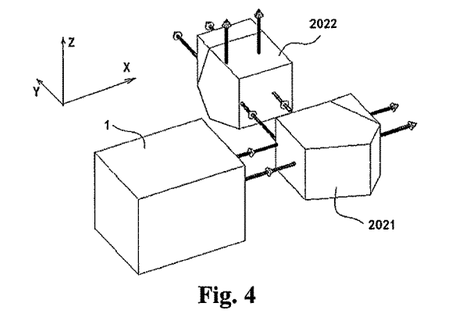
FIG. 4 is a schematic view of the second type of beam-turning unit in the present invention.

Referring to FIG. 4, the second type of beam-turning unit 2 is composed of the beam splitting pentagonal prisms 2021 and 2022. The measurement beam, which is parallel to the X-axis, is obtained by adjusting the position and direction of the measurement unit 1. The combination of the beam splitting pentagonal prisms 2021 and 2022 is then placed into the light path of the measurement unit 1. The beam from measurement unit 1 perpendicularly enters onto the beam splitting pentagonal prism 2021, and the reflected beam from the beam splitting pentagonal prism 2021 perpendicularly enters the beam splitting pentagonal prism 2022 by adjusting the position of the beam splitting pentagonal prisms 2021 and 2022. The three measurement beams, which are parallel to the X, Y, and Z axes of the measured equipment listed above, are obtained simultaneously by the second type of beam-turning unit 2.

Figure 5:
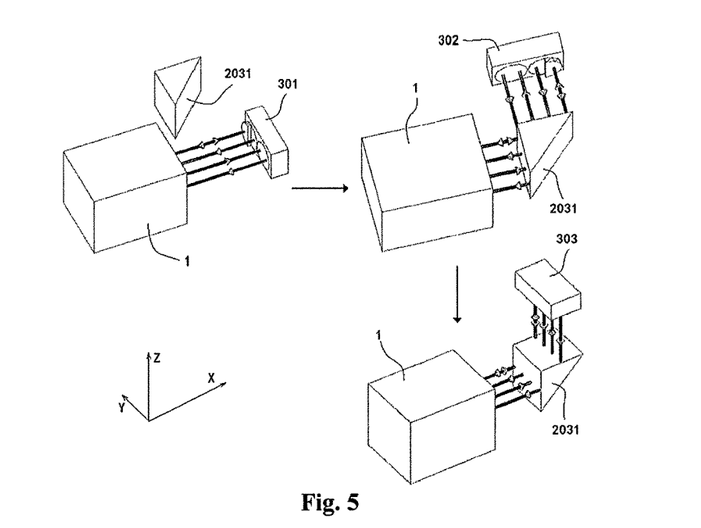
FIG. 5 is a schematic view of the third type of beam-turning unit in the present invention.

As shown in FIG. 5, the rectangle prism 2031 is used in the beam-turning unit 2 to turn the laser beam from the measurement unit 1. The rectangle prism 2031 is removed from the light path of the measurement unit 1 through manual or electro-kinetic operation. The measurement beam, which is parallel to the X-axis and reaches the six-degree-of-freedom error-sensitive component 301, is obtained by adjusting the position and direction of the measurement unit 1. The rectangle prism 2031 is then placed into the light path of the measurement unit 1 through manual or electro-kinetic operation. By adjusting the rectangle prism 2031 to make the measurement beam enters it perpendicularly, the measurement beam, which is parallel to the Y-axis and reaches the six-degree-of-freedom error-sensitive component 302, is obtained. The straight line parallel to the X-axis and passing through the center of the incident plane of the pentagonal prism 2031 is used as the rotation axis. The pentagonal prism 2031 is rotated by 90 degrees through the precise rotation component which is fixed with the pentagonal prism 2031. The measurement beam, which is parallel to the Z-axis and reaches the six-degree-of-freedom error-sensitive component 303, is then obtained. In this way, the three measurement beams, which are parallel to the X, Y, and Z axes of the measured equipment previously listed, are obtained step-by-step by the second type of the beam-turning unit 2.

Figure 6:
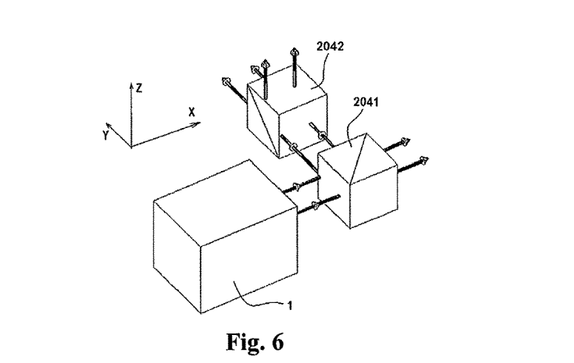
FIG. 6 is a schematic view of the fourth type of beam-turning unit in the present invention.

Referring to FIG. 6, the fourth type of beam-turning unit 2 is composed of the beam splitting prisms 2041 and 2042. The measurement beam, which is parallel to the X-axis, is obtained by adjusting the position and direction of the measurement unit 1. The combination of the beam splitting prisms 2041 and 2042 is then placed into the light path of the measurement unit 1. The beam from the measurement unit 1 perpendicularly enters the beam splitting prism 2041, and the reflected beam from the beam splitting prism 2041 is directed to perpendicularly enter the beam splitting prism 2042 through adjustment of the position of the beam splitting prisms 2041 and 2042. The three measurement beams, which are parallel to the X, Y, and Z axes of the measured equipment list above, are obtained simultaneously by the fourth type of the beam-turning unit 2.

As shown in FIG. 3 through FIG. 6, the three mutual perpendicular measurement beams, which are parallel to the X, Y, and Z axes of the equipment previously listed, are obtained simultaneously or step-by-step by four different types of the beam-turning unit 2. The optical property of the beam turning prism and the combination of the beam splitting and turning prisms will result in a difference in the relative order of the two measurement beams, which are from the measurement unit 1 and are turned by the beam-turning unit 2 to the direction perpendicular to the beam transmission direction. Therefore, different types of the error-sensitive unit 3 are needed to cooperate with the different types of beam-turning unit 2.

Figure 7:
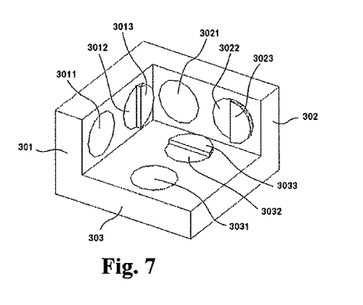
FIG. 7 is a schematic view of the first type of error-sensitive unit in the present invention.

The first type of the error-sensitive unit 3, which is corresponding to the first type of the beam-turning unit 2, is shown in FIG. 7. The error-sensitive unit 3 consists of three mutual perpendicular 6DOF error-sensitive components 301, 302 and 303, which are sensitive to the six degree-of-freedom geometric errors of the X, Y, and Z axes of the equipment previously listed.

The 6DOF error sensitive component 301 consists of two retro-reflector elements 3011 and 3012, and one beam-splitting element 3013. The retro-reflector element 3011 is sensitive to the position error, horizontal straightness error, and vertical straightness error of the X-axis. The beam-splitting element 3013 is sensitive to the pitch and yaw of the X-axis. The combination of the two retro-reflector elements 3011 and 3012 is sensitive to the roll of the X-axis.

The 6DOF error sensitive component 302 consists of two retro-reflector elements 3021 and 3022, and one beam-splitting element 3023. The retro-reflector element 3021 is sensitive to the positioning error, horizontal and vertical straightness error of the Y-axis. The beam-splitting element 3023 is sensitive to the pitch and yaw of the Y-axis. The combination of the two retro-reflector elements 3021 and 3022 is sensitive to the roll of the Y-axis.

The 6DOF error sensitive component 303 consists of two retro-reflector elements 3031 and 3032, and one beam-splitting element 3033. The retro-reflector element 3031 is sensitive to the positioning error, horizontal and vertical straightness error of the Z-axis. The beam-splitting element 3033 is sensitive to the pitch and yaw of the Z-axis. The combination of the two retro-reflector elements 3031 and 3032 is sensitive to the roll of the Z-axis.

Figure 8:
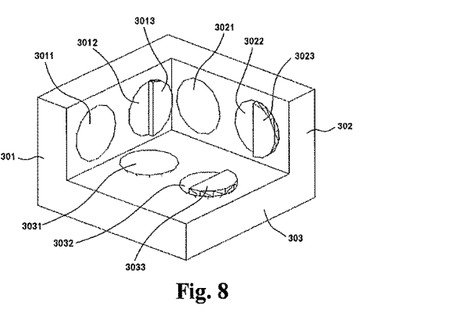
FIG. 8 is the schematic view of the second type of error-sensitive unit in the present invention.
Figure 9:
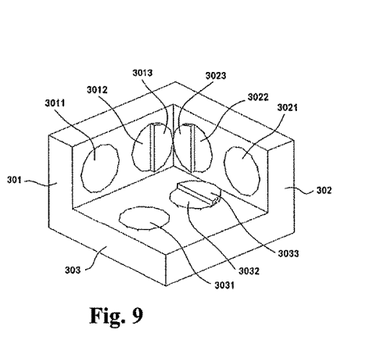
FIG. 9 is a schematic view of the third type of error-sensitive unit in the present invention.
Figure 10:
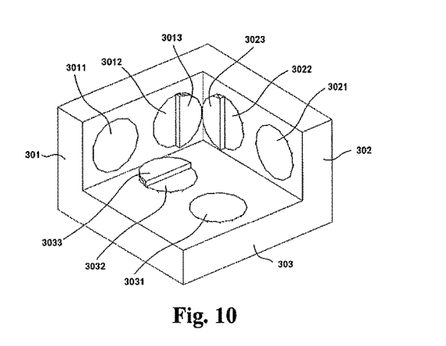
FIG. 10 is a schematic view of the fourth type of error-sensitive unit in the present invention.

The second, third and fourth types of the error sensitive unit 3, which correspond to the second, third and fourth types of the beam-turning unit 2, respectively, are shown in FIG. 8, FIG. 9 and FIG. 10. Each type of the error sensitive unit 3 is composed of three mutual perpendicular 6DOF error sensitive components 301, 302, and 303, which are sensitive to the 6DOF GMEs of the X, Y, and Z axes of the measured equipment previously listed. The positions of the retro-reflector elements and the beam-splitting elements in 6DOF error sensitive components 301, 302, and 303 correspond to the positions of the two measurement beams, from the measurement unit 1 to the 6DOF error sensitive components 301, 302, and 303, after the transmission from the beam turning unit 2.

Figure 11:
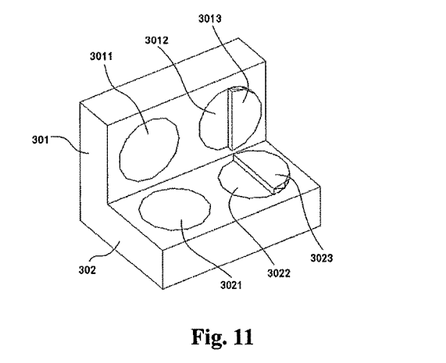
FIG. 11 is a schematic view of the fifth type of error-sensitive unit in the present invention.

As shown in FIG. 11, the fifth type of the error sensitive unit 3 consists of two mutual perpendicular 6DOF error-sensitive components 301 and 302, which are sensitive to the 6DOF GMEs of the X and Z axes of the equipment to be measured previously listed. The 6DOF error sensitive component 301 is sensitive to the 6DOF GMEs of the Y-axis after 90-degree rotation around the Z axis.

The cube-corner reflectors are used as the retro-reflector elements 3011, 3012, 3021, 3022, 3031, and 3032, shown in FIG. 7 through FIG. 11. The plane beam-splitter or the beam-splitting film which is coated on the corresponding position of the retro-reflector element is used as the beam-splitting elements 3013, 3023, and 3033.

As shown in FIG. 3, the pentagonal prism 2011 is used in the first type of the beam-turning unit 2 to obtain step-by-step the measurement beams, which are parallel to the X, Y, and Z axes of the equipment previously listed. The pentagonal prism 2011 has no influence on the relative order of the two measurement beams emitted from the measurement unit 1 in the transmission directions. It also does not change the relative positions between the reference datum line for angle measurement and the angle measurement beams, which are reflected by the beam-splitting elements 3013, 3023, and 3033. Therefore, the first type of beam-turning unit 2 is used in the preferred embodiment of the present invention to simultaneously measure the 6DOF GMEs of each linear motion axis.

Figure 12:
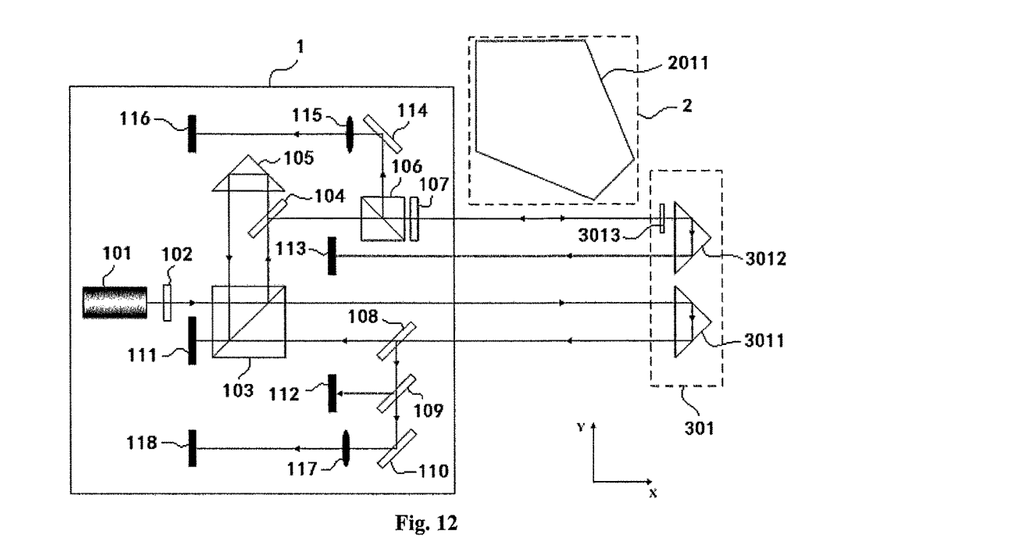
FIG. 12 is a schematic view of simultaneous measurement for the 6DOF GMEs along the X-axis in the present invention.

As shown in FIG. 12, the 6DOF GMEs of the X-axis of the equipment to be measured previously listed are simultaneously measured by the measurement unit 1 in cooperation with the 6DOF error-sensitive component 301. The measurement unit 1 consists of the dual frequency laser 101; the quarter-wave plates 102 and 107; the polarization beam-splitters 103 and 106; the beam-splitters 104, 108, and 109; the retro-reflector element 105; the beam-reflecting elements 110 and 114; the detectors 111, 112, 113, 116 and 118; the lens 115 and 117. The six-degree-of-freedom error-sensitive component 301 consists of the retro-reflector elements 3011 and 3012, and the beam-splitting element 3013.

As shown in FIG. 12, the error-sensitive unit 3 and the 6DOF error-sensitive component 301 move along the X-axis to a certain measurement point. During the measurement process of the X-axis, the pentagonal prism 2011 in the beam-turning unit 2 is moved out of the light path of the measurement unit 1.

The beam from the dual frequency laser 101 passes through the quarter-wave plate 102 and is split by the polarization beam-splitter 103. The reflected beam from 103 is split again by the beam-splitter 104, and the transmitted beam from 104 is used as the reference beam for interferometric length measurement. The transmitted beam from the polarization beam-splitter 103 is reflected by the retro-reflector element 3011 and split by the beam-splitter 108. The transmitted beam from beam-splitter 108 and the reflected beam from the retro-reflector element 105 interfere on the detector 111, and the position error of the measurement point on the X-axis is obtained.

The reflected beam from the beam-splitter 108 is split by the beam-splitter 109. The reflected beam from the beam-splitter 109 reaches the detector 112. The horizontal and vertical straightness errors of the measurement point on the X-axis are obtained.

The transmitted beam from the beam-splitter 109 is reflected by the beam-reflecting element 110 and is focused onto the detector 118 by lens 117. The angular drift of the measurement beam is measured in this way.

The reflected beam from the beam-splitter 104 passes through the polarization beam-splitter 106 and the quarter-wave plate 107, and is partially reflected by the beam-splitting element 3013. The reflected beam from 3013 passes through the quarter-wave plate 107, and is totally reflected by the polarization beam-splitter 106. The reflected beam from the beam-splitter 106 is reflected by the beam-reflecting element 114 and is focused onto the detector 116 by lens 115. The pitch and yaw of the measurement point on the X-axis are obtained.

The transmitted beam from the beam-splitting element 3013 is reflected by the retro-reflector element 3012 and is directed onto the detector 113. The horizontal and vertical straightness errors of the measurement point on the X-axis are obtained.

The vertical straightness errors of two different measurement points on the X-axis with the same horizontal position are measured by the detectors 112 and 113. The roll of the measurement point on the X-axis is calculated using these two straightness errors.

Figure 13:
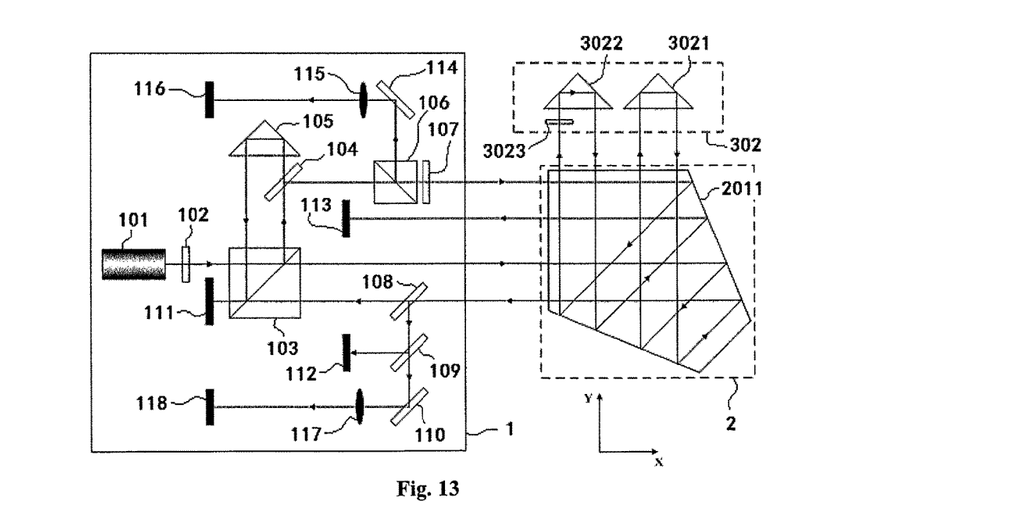
FIG. 13 is a schematic view of simultaneous measurement for the 6DOF GMEs along the Y-axis in the present invention.

As shown in FIG. 13, the 6DOF GMEs of the Y and Z axes of the measured equipment previously listed are simultaneously measured by the measurement unit 1 in cooperation with the beam-turning unit 2 and the error-sensitive unit 3.

The error-sensitive unit 3 and the 6DOF error-sensitive component 302 move along the Y-axis to a certain measurement point. The transmitted beam from the polarization beam-splitter 103 and the reflected beam from the beam-splitter 104, which are parallel to the X-axis, are used as the measurement beams. The measurement beams are turned in the directions parallel to the Y-axis by the pentagonal prism 2011 in the beam-turning unit 2 and reach the 6DOF error-sensitive component 302. The reflected beam from the beam-splitting element 3023 and the reflected beam from the retro-reflector elements 3021 and 3022 are then turned back to the measurement unit 1 by the beam-turning unit 2. The 6DOF GMEs of the Y-axis are measured in this way.

Similarly, the beam from the measurement unit 1 is turned in the direction parallel to the Z-axis by the beam-turning unit 2. The 6DOF GMEs of the Z-axis are obtained by the measurement unit 1 in cooperation with the beam-turning unit 2 and the 6DOF error-sensitive component 303.

A method for measuring 21 GMEs through single installation and step-by-step measurement is provided and used in the present system. The 21 GMEs of the numerical control machine tool, the machining center, or the coordinate measuring machine are obtained according to the following procedures:

1) installating the measurement system. As shown in FIG. 1, the 6DOF GME simultaneous measurement unit 1 and the beam-turning unit 2 are mounted on the clamping workpiece of the equipment to be measured listed above. The error-sensitive unit 3 is fixed on the clamping tool.

Figure 14:
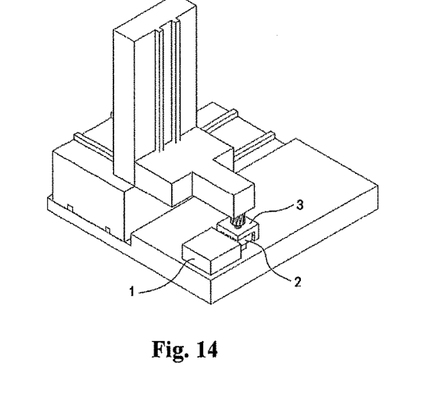
FIG. 14 is a schematic view of the start point for measuring 21 GMEs provided by the present invention.

2) adjusting the measurement system. As shown in FIG. 14, the three axes of the precise machining and measuring equipment listed above are adjusted to the initial position predetermined by related measurement standards, such as ISO 230-1, and the error-sensitive unit 3 is placed as close as possible to the beam-turning unit 2. This predetermined initial position is defined as the start point. The positions and directions of the measurement unit 1 and the beam-turning unit 2 are adjusted simultaneously or in separate steps to obtain the three measurement beams, which are parallel to the X, Y, and Z axes of the equipment listed above, according to the different laser turning structures of the beam-turning unit 2. The three measurement beams are mutually perpendicular, according to the inherent property of the beam-turning unit 2, and are used as the reference datum lines for perpendicularity error measurement.

Figure 15:
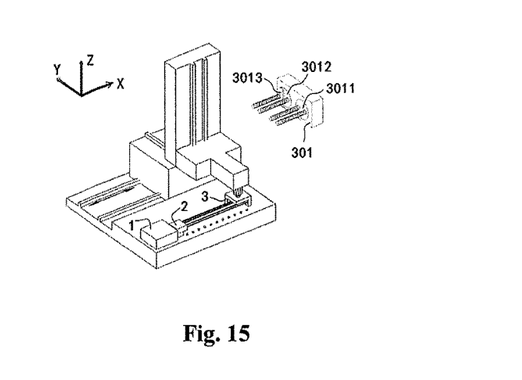
FIG. 15 is a schematic view of the measurement along the X-axis in the laser measurement method for 21 GMEs provided by the present invention.

3) measuring the 6DOF GMEs of the X-axis. As shown in FIG. 15, the beam from the measurement unit 1 is directed to be parallel to the X-axis of the equipment by the beam-turning unit 2. By controlling the motion of the equipment, the laser measurement system for 21 GMEs is set at the start point. The 6DOF GMEs of the start point of the X-axis, including the position error, the horizontal and vertical straightness errors, and pitch, yaw, and roll, are obtained by the measurement unit 1 combined with the corresponding six-degree-of-freedom error-sensitive component 301 on the error-sensitive unit 3. The linear guide moves along the X-axis with the interval predetermined by related measurement standards, such as ISO 230-1, and reaches the next measurement point while the Y and Z axes are kept static. The six degree-of-freedom geometric errors of this point are measured by the measurement unit 1. The measurement of the X-axis is performed point-by-point to the last measurement point and the six degree-of-freedom geometric errors of each of the measurement points on the X-axis are obtained. The linear guide moves along the X-axis in the opposite direction with the same interval, and the measurement is performed point-by-point to obtain the errors of all of the measurement points. In this way, the 6DOF GMEs of each of the measurement points in bidirectional movement are obtained through point-to-point static measurement. The errors of all the measurement points in bidirectional movement are obtained more than once by repeating the mentioned procedures. In another usage option, the linear guide moves from the start point to the farthest end and returns to the start point in constant speed, and continuous measurements are obtained by the measurement unit 1, combined with the corresponding 6DOF error-sensitive component on the error-sensitive unit 3. The errors of all the measurement points on the X-axis in bidirectional movement are obtained through dynamic measurement.

Figure 16:
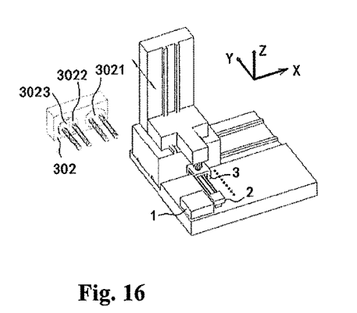
FIG. 16 is a schematic view of the measurement along the Y-axis in the laser measurement method for 21 GMEs provided by the present invention.

4) measuring the 6DOF GMEs of the Y-axis. As shown in FIG. 16, the beam-turning unit 2 points the beam from the measurement unit 1 in the direction parallel to the Y-axis of the equipment previously listed. The Y-axis linear guide moves according to the procedures mentioned in step 3), and the 6DOF GMEs of each of the measurement points on the Y-axis in bidirectional movement are obtained through point-by-point static measurement or continuous dynamic measurement.

Figure 17:
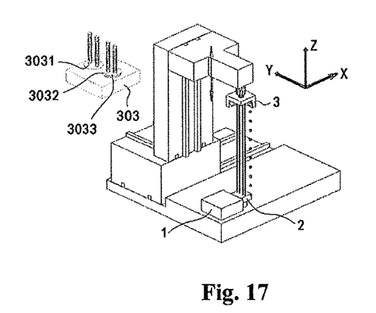
FIG. 17 is a schematic view of the measurement along the Z-axis in the laser measurement method for 21 GMEs provided by the present invention.

5) measuring the 6DOF GMEs of Z-axis. As shown in FIG. 17, the beam-turning unit 2 points the beam from the measurement unit 1 in the direction parallel to the Z-axis of the equipment previously listed. The Z-axis linear guide moves according to the procedures mentioned in steps 3) or 4), and the 6DOF GMEs of each of the measurement points on the Z-axis in bidirectional movement are obtained through point-by-point static measurement or continuous dynamic measurement.

6) Data processing. The 18 geometric errors are obtained through point-by-point static measurement or continuous dynamic measurement by performing steps (3), (4) and (5). The angle between the motion trajectory along the three axes and the measurement beam for corresponding axes, which is the reference datum for perpendicularity error measurement, can be calculated by processing the straightness errors of the three axes. The perpendicularity errors among the three motion axes can then be obtained. Therefore, a total of 21 GMEs are obtained.

The invention claimed is:

1. A laser measurement system for measuring up to 21 geometric motion errors (GMEs), comprising a 6 degrees of freedom (DOF) GME simultaneous measurement unit, a beam-turning unit, and an error-sensitive unit, wherein
the 6DOF geometric error simultaneous measurement unit cooperates with the error-sensitive unit to simultaneously or individually measure the GMEs of 6DOF (position error, horizontal straightness error, vertical straightness error, yaw error, pitch error and roll error) of a single axis (totally 18 geometric errors for the three axes) of a precise machining and measuring equipment;

the beam-turning unit splits or turns a laser beam from the 6DOF geometric error simultaneous measurement unit to the X, Y, and Z directions in proper order, and splits or turns the beam from the error-sensitive unit to the 6DOF geometric error simultaneous measurement unit, so as to simultaneously measure 6DOF geometric errors of each corresponding axis; and perpendicularity errors among the three axes are further obtained by processing straightness errors of the three axes.

2. The system according to claim 1, wherein the error-sensitive unit comprises three mutually perpendicular 6DOF error-sensitive components, which are sensitive to the 6DOF GMEs of three mutually perpendicular linear motion axes of the equipment, respectively; or the error-sensitive unit comprises two mutually perpendicular 6DOF error-sensitive components, which are sensitive to the 6DOF GMEs of two mutually perpendicular linear motion axes of the equipment, one of the two 6DOF error-sensitive components is sensitive to the 6DOF GMEs of a third linear motion axis of the equipment through a 90-degree rotation.

3. The system according to claim 2, wherein the 6DOF error-sensitive component comprises two retro-reflector elements and one beam-splitting element;

the retro-reflector element is sensitive to a position error, a horizontal straightness error, and a vertical straightness error of a linear motion axis;

the beam-splitting element is sensitive to a pitch and a yaw of the linear motion axis;

a combination of the two retro-reflector elements is sensitive to a roll of the linear motion axis;

a cube-corner reflector is used as the retro-reflector element, and a plane beam-splitter is used as the beam-splitting element.

4. The system according to claim 1, wherein the beam-turning unit comprises a beam-turning prism, or a combination of a beam-splitting prism and a beam-turning prism;

through translation and rotation, the beam-turning prism, which includes a polygon prism or a rectangle prism, turns the measurement beam from the 6DOF GME simultaneous measurement unit to the directions which are parallel to the three linear motion axes of the equipment in separate steps;

the combination of the beam-splitting prism and the beam-turning prism is a combination of two beam-splitting polygon prisms, or a combination of two beam-splitting rectangle prisms; and the beam from the 6DOF GME simultaneous measurement unit simultaneously splits into three mutually perpendicular beams, which are parallel to the three linear motion axes of the equipment.

5. The system according to claim 1 wherein the precise machining and measuring equipment is a NC machine tool, a machining center or a coordinate measuring machine.

6. A method for step-by-step measuring up to 21 geometric motion errors (GMEs) of a precise machining and measuring equipment after a single installation, wherein said method comprises the steps of:

(a) installing a measurement system, in which with respect to the equipment, a 6 degrees of freedom (DOF) GME simultaneous measurement unit and a beam-turning unit are mounted independently or integrally on a clamping workpiece, while the error-sensitive unit is mounted on a clamping tool;

(b) adjusting the measurement system, in which three axes of the equipment are adjusted to initial positions predetermined by measurement standards ISO230-1, the error-sensitive unit is placed as close as possible to the beam-turning unit, and this predetermined initial position is defined as a start point; by adjusting the positions and directions of the beam-turning unit and the 6DOF GME simultaneous measurement unit, the three measurement beams, which are parallel to the X, Y, and Z axes of the equipment, are obtained simultaneously or in separate steps according to the different beam turning structures of the laser beam-turning unit;

(c) measuring the 6DOF GMEs of the X-axis, in which the beam-turning unit directs a beam from the 6DOF GME simultaneous measurement unit to be parallel to the X-axis of the equipment, controlling the system to move to the start point, then the 6DOF GMEs of the start point, including a position error, a horizontal straightness error, a vertical straightness error, a pitch error, a yaw error and a roll error, are obtained by cooperation between the 6DOF GME simultaneous measurement unit and its corresponding 6DOF error-sensitive component of the error-sensitive unit, a linear guide moves along the X-axis with an interval predetermined by a related measurement standards ISO230-1, and reaches a next measurement point while the Y and Z axes are kept static, then the 6DOF GMEs of this point are measured; such measurement is performed point-by-point until the last measurement point, the 6DOF GMEs of all the measurement points on the X-axis are obtained; the linear guide moves along the X-axis in the opposite direction with the same interval, the measurement is performed point-by-point to obtain the 6DOF GMEs of all the measurement points, in this way, the 6DOFs of all the measurement points in the bidirectional movement are obtained through point-by-point static measurement, or the linear guide moves from the start point to the furthest end and returns to the start point in a constant speed, and the continuous measurement is conducted by cooperation between the 6DOF GME simultaneous measurement unit and its corresponding 6DOF error-sensitive component of the error-sensitive unit; the 6DOF GMEs of all the measurement points on the X-axis in the bidirectional movement can be obtained through measurement in movement;

(d) measuring the 6DOF GMEs of the Y-axis, in which the beam-turning unit directs a beam from the 6DOF GME simultaneous measurement unit to be parallel to the Y-axis of the equipment, the linear guide moves along the Y-axis according to the procedures mentioned in step (c), and the 6DOF GMEs of all the measurement points on the Y-axis in the bidirectional movement are obtained through point-by-point static measurement or continuous, in-motion measurement;

(e) measuring the 6DOF GMEs of the Z-axis, in which the beam-turning unit directs a beam from the 6DOF GME simultaneous measurement unit to be parallel to the Z-axis of the equipment, the linear guide moves along the Z-axis according to the procedures mentioned in step (c), and the 6DOF GMEs of all the measurement points on the Z-axis in the bidirectional movement are obtained through point-by-point static measurement or continuous, in-motion measurement;

(f) data processing, after performing the steps (c), (d) and (e), the 6DOF GMEs (totally 18) of each of the measurement points on the X, Y and Z axes of the measured equipment in the bidirectional movement are obtained, and another three perpendicularity errors among the three motion axes are obtained by data processing according to the measurement standards ISO230-1, therefore, a total of 21 geometric errors are obtained, the order of measuring the X, Y and Z axes according to the steps (c), (d) and (e) has no influence on the measurement results, and the same results can be obtained by performing steps (a)-(f) when the error-sensitive unit is fixed on the clamping workpiece and the 6DOF GMEs simultaneous measurement unit and the beam-turning unit are mounted integrally on the clamping tool of the equipment.

7. The method according to claim 6, wherein the 6DOF error-sensitive component can be replaced with a 5DOF error-sensitive component, a 4DOF error-sensitive component, or a 3DOF error-sensitive component, respectively, so as to correspondingly measure 18 geometric errors, 15 geometric errors, and 12 geometric errors by performing the measurement procedures.

8. The system according to claim 6 wherein the precise machining and measuring equipment is a NC machine tool, a machining center or a coordinate measuring machine.

9. A laser measurement system for measuring up to 21 geometric motion errors (GMEs), comprising a 6 degrees of freedom (DOF) geometric error simultaneous measurement unit, a beam-turning unit and an error-sensitive unit, wherein the 6DOF geometric error simultaneous measurement unit and the beam-turning unit are mounted on one of a clamping workpiece and a clamping tool, while the error-sensitive unit is mounted on the other one thereof, the beam-turning unit has several switchable working postures or several alternatives of component combinations in its installation status, the beam-turning unit splits or turns a laser beam from the 6DOF GME simultaneous measurement unit to X, Y, and Z directions in proper order, or the beam-turning unit splits or turns a beam from the error-sensitive unit to the 6DOF GME simultaneous measurement unit, so that the 6DOF GMEs of any corresponding axis are measured, perpendicularity errors among the three axes are further obtained by processing straightness errors of the three axes.

10. The system according to claim 9, wherein the 6DOF GME simultaneous measurement unit is cooperative with the error-sensitive unit so as to a measure positioning error, a horizontal straightness error, a vertical straightness error, a yaw error, pitch error and a roll error of the three linear guides or motion stages; and three perpendicularity errors among the axes are obtained by processing the straightness errors of the three linear guides;

the error-sensitive unit comprises three mutually perpendicular 6DOF error-sensitive components, which are sensitive to the 6DOF GMEs of three mutually perpendicular linear motion axes of the equipment, or the error-sensitive unit comprises two mutually perpendicular 6DOF error-sensitive components, which are sensitive to the 6DOF GMEs of two mutually perpendicular linear motion axes of the equipment, one of the two 6DOF error-sensitive components is sensitive to the 6DOF GMEs of the third linear motion axis of the equipment through a 90-degree rotation;

the 6DOF error-sensitive component comprises two retro-reflector elements and one beam-splitting element, the retro-reflector element is sensitive to the position error, the horizontal straightness error, and vertical straightness error of a linear motion axis, the beam-splitting element is sensitive to the pitch error and yaw error of the linear motion axis, and a combination of the two retro-reflector elements is sensitive to the roll error of the linear motion axis;

a cube-corner reflector is used as the retro-reflector element, while a plane beam-splitter is used as the beam-splitting element; and/or the beam-turning unit comprises a beam-turning prism, or a combination of a beam-splitting prism and a beam-turning prism, the beam-turning prism includes a polygon prism or a rectangle prism, the combination of the beam-splitting prism and the beam-turning prism is the combination of two beam-splitting polygon prisms, or the combination of two beam-splitting rectangle prism, and a beam from the 6DOF GME simultaneous measurement unit is splitted into three mutual perpendicular beams, which are parallel to the three linear motion axes of the equipment to be measured.

11. A method for step-by-step measuring up to 21 geometric motion errors (GMEs) of a precise machining and measuring equipment, after a single installation, wherein the method includes the following steps:

installing a measurement system, in which a 6 degrees of freedom (DOF) GME simultaneous measurement unit and a beam-turning unit are independently or integrally mounted on one of a clamping workpiece and a clamping tool, while an error-sensitive unit is mounted on the other one thereof;

adjusting the measurement system, in which three axes of the equipment are adjusted to predetermined initial positions, the error-sensitive unit is placed as close as possible to the beam-turning unit, and this initial position is defined as a start point; the working postures and multi-component combinations of the beam-turning unit are switched one-by-one in the installation state through rotation and translation, to obtain three measurement beams parallel to X, Y, and Z axes simultaneously or in separate steps; these three beams are mutually perpendicular, and are reference for measuring perpendicularity errors;

measuring the 6DOF GMEs of the X-axis, in which the beam-turning unit directs a beam from the 6DOF GME simultaneous measurement unit to be parallel to the X-axis of the equipment, and makes the laser measurement system set to the start point, 6DOF GMEs of the start point, including the position error, the horizontal straightness error, the vertical straightness error, the pitch error, the yaw error and the roll error, are obtained by cooperation between the 6DOF GME simultaneous measurement unit and its corresponding 6DOF error-sensitive component of the error-sensitive unit, a linear guide moves along the X-axis to a series of measurement points one by one with a predetermined interval in forward and backward directions, and the 6DOF GMEs of all measurement points are obtained through point-by-point static measurement; or the linear guide moves from the start point to the farthest end and returns to the start point in a constant speed, and a continuous measurement is conducted by the 6DOF GME simultaneous measurement unit and its corresponding 6DOF error-sensitive component of the error-sensitive unit, the GMEs of all the measurement points on the X-axis in the bidirectional movement are obtained through dynamic measurement;

measuring the 6DOF GMEs of the Y-axis, in which the beam-turning unit directs a beam from the 6DOF GME simultaneous measurement unit to be parallel to the Y-axis of the equipment, the GMEs of all the measurement points on the Y-axis in the bidirectional movement are obtained through point-by-point static measurement or continuous dynamic measurement;

measuring the 6DOF GMEs of the Z-axis, in which the beam-turning unit directs a beam from the 6DOF GME simultaneous measurement unit to be parallel to the Z-axis of the equipment, the GMEs of all the measurement points on the Z-axis in the bidirectional movement are obtained through point-by-point static measurement or continuous dynamic measurement;

data processing, in which an angle between a motion trajectory along the three axes and a measurement beam for corresponding axes, which is a reference for perpendicularity error measurement, is calculated by processing the straightness errors of the three axes, and the perpendicularity errors among the three motion axes are then obtained.

12. The method according to claim 11, wherein the 6DOF error-sensitive component can be replaced with a 5DOF error-sensitive component, a 4DOF error-sensitive component, or a 3DOF error-sensitive component, respectively, to correspondingly measure 18 geometric errors, 15 geometric errors, or 12 geometric errors.

13. The system according to claim 11 wherein the precise machining and measuring equipment is a NC machine tool, a machining center or a coordinate measuring machine.

* * * * *